United States Patent [19]

Braun

[11] 4,058,019

[45] Nov. 15, 1977

[54] UNBALANCE VIBRATION GENERATOR

[75] Inventor: Günther Braun, Wuppertal-Elberfeld, Germany

[73] Assignee: Losenhausen Maschinenbau AG, Dusseldorf, Germany

[21] Appl. No.: 699,483

[22] Filed: June 24, 1976

[30] Foreign Application Priority Data

July 19, 1975 Germany ............................ 2532333

[51] Int. Cl.[2] ........................ F16H 37/00; B07B 1/44

[52] U.S. Cl. .................................... 74/87; 209/366.5; 209/367

[58] Field of Search ................... 74/87; 259/DIG. 42; 209/366.5, 367

[56] References Cited

U.S. PATENT DOCUMENTS

| | | | |
|---|---|---|---|
| 952,565 | 3/1910 | Fraser | 209/366.5 |
| 2,771,279 | 11/1956 | Dearden | 74/87 |
| 2,921,477 | 1/1960 | Hanggi | 74/87 |
| 3,342,075 | 9/1967 | Lowe | 74/87 X |
| 3,810,394 | 5/1974 | Novak | 74/87 |

FOREIGN PATENT DOCUMENTS

| | | | |
|---|---|---|---|
| 1,106,435 | 7/1955 | France | 259/DIG. 1 |
| 1,483,413 | 9/1969 | Germany | 74/87 |

*Primary Examiner*—William L. Freeh
*Assistant Examiner*—Richard E. Gluck
*Attorney, Agent, or Firm*—William R. Laney

[57] ABSTRACT

An improved unbalance vibration generator adapted to be driven at varying rotational speeds while maintaining a substantially constant exciting force throughout a range of rotational speeds. The generator includes an unbalance mass comprising first and second unbalance masses journaled for rotation and angularly offset from each other 180° about the axis of rotation. The first unbalance mass is journaled on the axis of rotation and the second unbalance mass is radially movable in relation thereto. This radial movement is restrained by cam and spring means which provide predetermined non-linear restraint of the second unbalance mass relative to the first unbalance mass. This non-linear restraint corresponds to the centrifugal force acting on the rotating second unbalance mass which varies with the square of the rotational speed, thereby reducing the total unbalance of both unbalance masses as the rotational speed increases and, alternately, increasing the total unbalance as the rotational speed decreases while maintaining the exciting force substantially constant.

15 Claims, 3 Drawing Figures

UNBALANCE VIBRATION GENERATOR

BACKGROUND OF THE INVENTION

1. Field of the Invention

The invention relates to an unbalance vibration generator adapted to be driven at varying rotational speeds.

2. Description of the Prior Art

It is desirable to operate unbalance vibration generators at different rotational speeds, in order, for example, to be able to select the vibration frequency of a soil compactor in conformity with the elastic characteristics of a soil to be compacted, or in order to cause some other vibratory mechanical system to vibrate at its natural frequency. It has been found disadvantageous that the centrifugal force acting on a rotating, unbalanced unbalance mass varies with the square of the rotational speed. Therefore with a conventional unbalance vibration generator any variation of the rotational speed will automatically involve variation of the exciting force. This may have the result that either the exciting force becomes undesirably small, in the lower range of rotational speeds, or, if the unbalance is made correspondingly large, undesirably large exciting forces are obtained in the upper range of rotational speeds. Such large exciting forces, which are often not at all required, cause a correspondingly large load on the bearings. Therefore it is, in addition, desirable to provide a vibration generator in which the exciting force remains substantially constant with variations of the rotational speed within a certain range.

To this end a prior art unbalance vibration generator has two unbalance masses angularly offset by 180°. One unbalance mass is affixed to a rotor shaft of the unbalance vibration generator. The second unbalance mass is radially movable relative to the first one and is subjected to the action of a spring which acts in radial direction and counteracts the centrifugal force acting in the second unbalance mass. Therefore the unbalance of the unbalance means is the larger and the resultant unbalance of both unbalance masses is the smaller the higher the rotational speed is. Due to the linearity of the spring characteristic, however, the exciting force is kept constant within a very coarse approximation only.

SUMMARY OF THE INVENTION

The present invention contemplates an unbalance vibration generator adapted to be driven at varying rotational speeds comprising: a first unbalance mass having a center of gravity; means for mounting said first unbalance mass for rotation about an axis of rotation, said center of gravity of said first unbalance mass being located at a distance from said axis of rotation, whereby said center of gravity of the first unbalance mass and said axis of rotation define a radially extending plane; a second unbalance mass having a center of gravity; means for rotating said second unbalance mass together with said first unbalance mass and for guiding said second unbalance mass for radial movement in said radially extending plane, said center of gravity of said second unbalance mass being located in said radially extending plane at a distance from said axis of rotation and on the side of said axis of rotation opposite to the center of gravity of said first unbalance means and resilient restraining means engaging said second unbalance mass to counteract any radially outward movement of said second unbalance mass due to the centrifugal force acting thereon, in accordance with the invention said restraining means comprise spring means and cam means, said spring means being arranged to act on said second unbalance mass through said cam means, said first and second unbalance mass, said spring means and said cam means being so dimensioned that the resultant centrifugal force of the two unbalance masses is substantially constant at all rotational speeds within a range of rotational speeds.

It is an object of the invention to provide an unbalance vibration generator which has substantially constant exciting force with variable rotational speeds.

It is a further object of the invention to provide an advantageous design of an unbalance vibration generator having an exciting force substantially independent of rotational speed.

Other objects and advantages of the present invention will be evident from the following detailed description when read in conjunction with the accompanying drawings.

DESCRIPTION OF A PREFERRED EMBODIMENT

Figure 1:
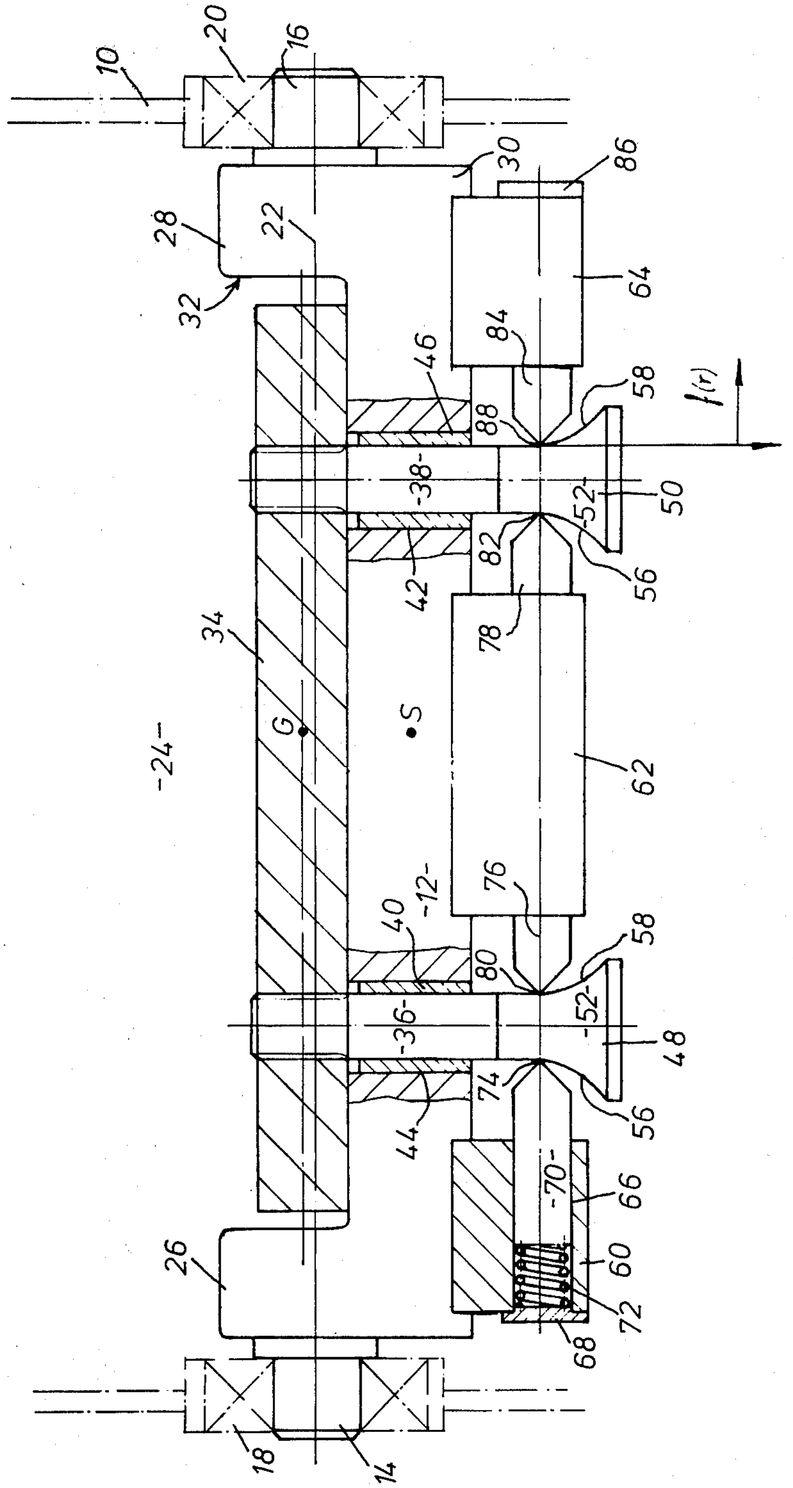
FIG. 1 is an elevational view of the unbalance mass structure in an unbalance vibration generator of the present invention.

An embodiment of the present invention will now be described with reference to the accompanying drawings. A first unbalance mass 12 having trunnions 14 and 16 is mounted in bearings 18 and 20, respectively, in a housing 10. Thus the first unbalance mass is mounted for rotation about an axis of rotation 22. The center of gravity S of the first unbalance mass 12 is located, in the position of the unbalance mass shown, below this axis of rotation. Thus, if FIG. 1 is regarded as an instantaneous photograph of the rotating unbalance mass, a centrifugal force directed to the bottom of FIG. 1 acts on the unbalance mass. The center of gravity S and the axis of rotation 22 determine a radially extending plane 24, which in the "instantaneous photograph" coincides with the plane of the paper.

The first unbalance mass 12 comprises end portions 26 and 28 which bear the trunnions 14 and 16, respectively, and a body 30 laterally offset relative to the axis of rotation 22 and interconnecting the two end portions. Thus an elongated recess 32 is defined intermediate the end portions 26 and 28. A second unbalance mass 34 is located in this recess 32. The unbalance mass 34 is guided in bushings 40 and 42 by means of a pair of parallel guide pins 36 and 38, respectively. The bushings 40 and 42 are mounted in radial guide bores 44 and 46, respectively, of the first unbalance mass. These radial guide bores 44 and 46 extend, mutually parallel, through the body 30 of the first unbalance mass 12. The axes of the radial guide bores 44, 46 and of the guide pins 36, 38 are located in the radially extending plane 24 defined by the center of gravity S and the axis of rotation 22. In the abutment position illustrated, in which the second unbalance mass 34 abuts the inner surface of the body 30 of the first unbalance mass the center of gravity G of the second unbalance mass 34 is located in the radially extending plane on the side of the axis of rotation 22 opposite to the center of gravity S of the first unbalance mass. With the two unbalance masses 12 and 34 rotation, the centrifugal force acting on the unbalance mass 34 (to the top of FIG. 1 in the "instantaneous photograph") urges the second unbalance mass radially outwards.

Figure 2:
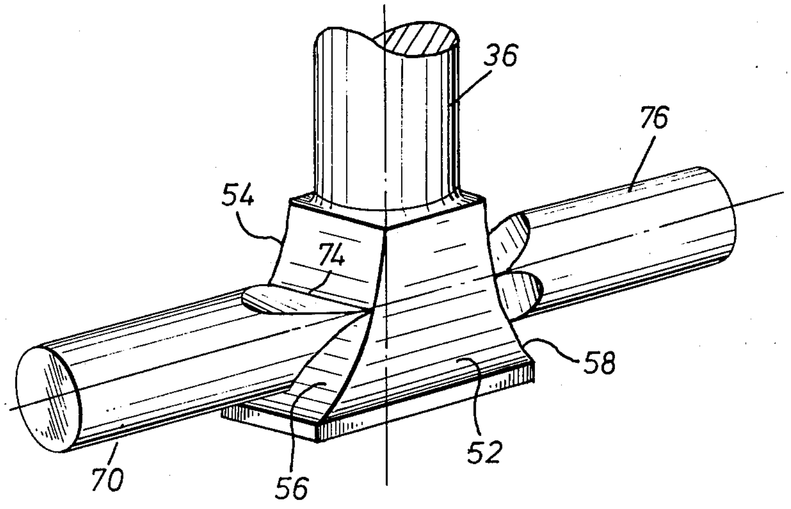
FIG. 2 is a perspective view of a detail of the structure of FIG. 1.

The guide pins 36 and 38 are provided with flaring heads 48 and 50, respectively, as can best be seen from FIG. 2. Each head 48 and 50 has a pair of plane surfaces 52, 54 on opposite sides and parallel to the radially extending plane 24. Intermediate said plane surfaces 52, 54 are opposite, flaring concave cam surfaces 56, 58, which extend normal to the radially extending plane 24.

A first outer guide block 60 is affixed to the body 30 of the first unbalance mass 12 on the left-hand side of the cam surface 56 of head 48 in FIG. 1. Also affixed to the body 30 of the first unbalance mass 12 is a central guide block 62 intermediate the heads 48 and 50, and a second outer guide block 64 on the right-hand side of cam surface 58 of head 50 in FIG. 1. An axial bore 66 is provided in the first outer guide block 60, the axis of this bore being located also in the radially extending plane 24. At its outer, i.e., left end in FIG. 1, the axial bore 66 is closed by a closure member 68. A pressing pin 70 slides in axial bore 66. A compression spring 72 abuts the closure member 68 and urges the pressing pin 70 with an edge 74 against the cam surface 56. In similar manner (not illustrated) two pressing pins 76 and 78 are guided in the central guide block 62 and project therefrom on opposite sides. The pressing pins 76 and 78 engage the cam surface 58 of head 48 and the cam surface 56 of head 50, respectively, with edges 80 and 82, respectively, under the action of a central compression spring (not shown). Eventually a pressing pin 84 is guided in the guide block 64 and engages the cam surface 58 of head 50 with an edge 88 under the action of a compression spring (not shown) abutting a closure member 86.

When the unbalance masses 12 and 34 rotate, the unbalance mass 34 is lifted from the abutment and urged outwards under the action of the centrifugal force. Thereby also the guide pins 36, 38 are moved towards the top of FIG. 1, the pressing pins 70 and 76 and 78 and 84, respectively, being urged away from each other by the cam surfaces 56, 58 of the heads 48 and 50, respectively, and the springs, such as 72, being compressed. Due to the slope of the cam surfaces 56 and 58, the spring forces exert force components on the guide pins 36 and 38, said components acting longitudinally along the axes of the pins towards the bottom of FIG. 1. These force components counteract the centrifugal force acting on the unbalance mass, said centrifugal force being a function of rotational speed. Thus a state of equilibrium will be achieved with each rotational speed, in which said longitudinal components of the spring forces just balance the centrifugal force. The higher the rotational speed is the further is the second unbalance mass 34 moved outwards and the larger is the centrifugal force acting thereon. The centrifugal force acting on the second unbalance mass 34 is opposed to the centrifugal force acting on the first unbalance mass 12, whereby the resultant unbalance is reduced with increasing rotational speed. The cam surfaces, which determine the relation between restraining force and distance of the center of gravity of the second unbalance mass 34 from the axis of rotation 22, are so dimensioned that a substantially constant resultant centrifugal force of the two unbalance masses 12 and 34 and thus a constant exciting force of the vibration generator is achieved within a predetermined range of rotational speeds.

Preferably the cam surfaces are curved in accordance with the following function:

$$f(\rho) = \sqrt{\frac{2Z\,r_o}{C}} \cdot \sqrt{1 - \rho + \frac{1}{U}\ln\frac{1-U}{1-U\rho}}\ ,$$

wherein $f$ — is the distance by which the cam surface extends beyond the periphery of the guide pin at the point of engagement of the pressing pin, $r$ — is the distance of the center of gravity of the second unbalance mass from the axis of rotation, $r_o$ — is the minimum value of the distance of the center of gravity of the second unbalance mass from the axis of rotation, $\rho = r/r_o$, Z — is the desired constant exciting force, C — is the spring rate of the compression spring acting on the pressing pin and U — is the ratio quantity resulting from $(1-U)U_1\omega_o^2 = Z$, when $U_1$ — is the unbalance of the first unbalance mass and $\omega_o$ — is the lowest exciting angular frequency.

In a preferred embodiment the following specifications were given:

$U_1$ = 0.2 kilogram meter $M_2$ = 10 kilograms

Z = 2000 kiloponds $n_o$ = 1000 revolutions per minute $n_{max}$ = 1500 revolutions per minute, wherein $M_2$ is the mass of the second unbalance mass 34 and $n_o$ and $n_{max}$ are the limits of the range of rotational speeds used. With the above values the table hereinbelow gives the following quantities n = exciting rotational speed in revolutions per minute $\omega^2$ = square of angular frequency in $sec^{-2}$ $P_1$ = centrifugal force acting on the first unbalance mass 12 in kiloponds $P_2$ = centrifugal force acting on the second unbalance mass 34 in kiloponds $r$ = distance of the center of gravity G of the second unbalance mass 34 from the axis of rotation 22 in millimeters, $\rho = r/r_o$ $$I = \sqrt{1 - \rho + \frac{1}{U}\ln\frac{1-U}{1-U\rho}}$$

The spring rate C is selected such that the slope angle of the cam surface is larger than the angle of friction, thus in the embodiment is larger than 15°. The largest slope should not amount to more than 60°, in order to achieve an acceptable accuracy of adjustment. In the embodiment the total spring rate due to the action of all springs has been selected as C = 150 kiloponds per millimeter. The slope angle is then between 30° and 45°.

From this the following table results:

| n[RρM] | ω²[sec.⁻²] | P₁[kp] | P₂[kp] | r[mm] | ρ | I | f(ρ) [mm] |
|---|---|---|---|---|---|---|---|
| 1000 | 10966.227 | 2193.25 | 193.25 | $1.75 = r_o$ | 1 | 0 | 0 |
| 1050 | 12090.265 | 2418.053 | 418.053 | 3.46 | 1.97 | 0.38 | 2.60 |
| 1100 | 13269.135 | 2653.827 | 653.827 | 4.93 | 2.80 | 0.60 | 4.11 |
| 1150 | 14502.835 | 2900.567 | 900.567 | 6.21 | 3.53 | 0.80 | 5.48 |
| 1200 | 15791.367 | 3158.273 | 1158.273 | 7.33 | 4.16 | 0.98 | 6.71 |
| 1250 | 17134.73 | 3426.946 | 1426.946 | 8.33 | 4.73 | 1.15 | 7.88 |
| 1300 | 18532.924 | 3706.585 | 1706.585 | 9.18 | 5.22 | 1.30 | 8.91 |
| 1350 | 19985.949 | 3997.19 | 1997.19 | 9.99 | 5.68 | 1.45 | 9.93 |
| 1400 | 21493.805 | 4298.761 | 2298.761 | 10.69 | 6.07 | 1.59 | 10.89 |
| 1450 | 23056.493 | 4611.299 | 2611.299 | 11.33 | 6.44 | 1.72 | 11.78 |
| 1500 | 24674.011 | 4934.802 | 2934.802 | 11.89 | 6.76 | 1.84 | 12.61 |

Figure 3:
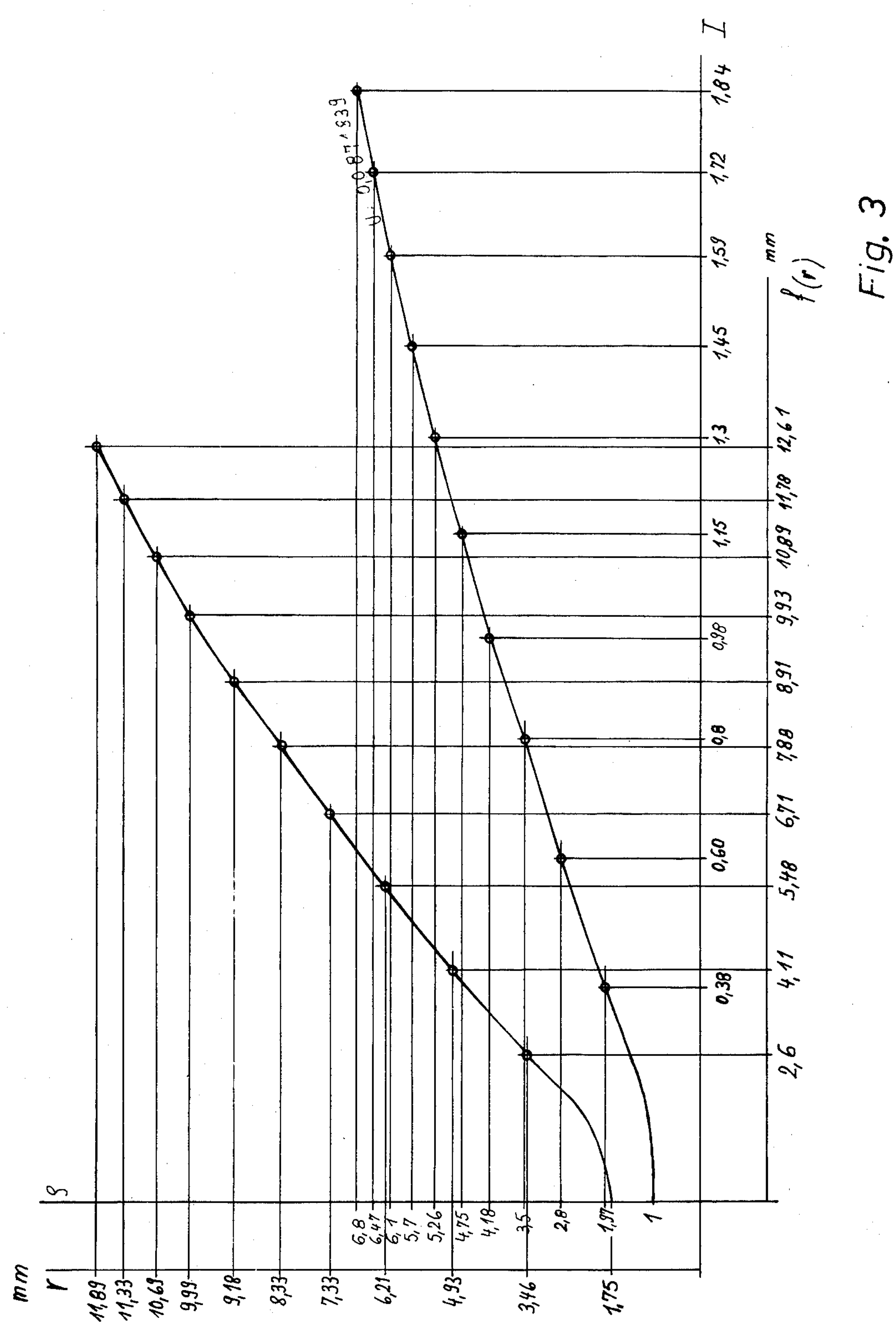
FIG. 3 are diagrams illustrating the shape of cam surfaces provided in the structure of FIGS. 1 and 2.

The graphs I=I and $f=f(\rho)$ are illustrated in FIG. 3.

Changes may be made in the combination and arrangement of parts or elements has heretofore set forth in the specification and shown in the drawings without departing from the spirit and scope of the invention as defined in the following claims.

What is claimed is:

1. In an unbalance vibration generator adapted to be driven at varying rotational speeds comprising:

a first unbalance mass having a center of gravity; means for mounting said first unbalance mass for rotation about an axis of rotation; said center of gravity of said first unbalance mass being located at a distance from said axis of rotation, whereby said center of gravity of the first unbalance mass and said axis of rotation define a radially extending plane;

a second unbalance mass having a center of gravity; means for rotating said second unbalance mass together with said first unbalance mass and for guiding said second unbalance mass for radial movement in said radially extending plane, said center of gravity of said second unbalance mass being located in said radially extending plane at a distance from said axis of rotation and on the side of said axis of rotation opposite to the center of gravity of said first unbalance mass; and resilient restraining means engaging said second unbalance mass to counteract any radially outward movement of said second unbalance mass due to the centrifugal force acting thereon, the improvement wherein said restraining means comprises spring means and cam means, said spring means being arranged to act on said second unbalance mass through said cam means, said first and second unbalance masses, said spring means and said cam means being so dimensioned that the resultant centrifugal force of the two unbalance masses is substantially constant at all rotational speeds within a range of rotational speeds.

2. An unbalance vibration generator as set forth in claim 1 wherein said unbalance mass rotating and guiding means comprises a pair of parallel guide pins on said second unbalance mass and a pair of parallel guide bores through said first unbalance mass for receiving said guide pins, the axes of said guide pins and guide bores being located in said radially extending plane, said guide pins projecting from said guide bores at the ends thereof remote from said second unbalance mass;

said cam means comprising: flaring heads on said guide pins projecting from said guide bores and having cam surfaces thereon, and pressing pins on said first unbalance mass which are guided for movement parallel to the axis of rotation, said pressing pins engaging said cam surfaces of said heads; and said spring means being arranged to act in an axial direction on said pressing pins.

3. An unbalance vibration generator as set forth in claim 2 wherein said cam surface is curved in accordance with the following function:

$$f(\rho) = \sqrt{\frac{2Z\,r_o}{C}} \cdot \sqrt{1 - \rho + \frac{1}{U}\ln\frac{1-U}{1-U_\rho}}\ ,$$

wherein $f$ — is the distance by which the cam surface extends beyond the periphery of the guide pin at the point of engagement of the pressing pin, $r$ — is the distance of the center of gravity of the second unbalance mass from the axis of rotation, $r_o$ — is the minimum value of the distance of the center of gravity of the second unbalance mass from the axis of rotation, $\rho = r/r_o$, Z — is the desired constant exciting force, C — is the spring rate of the compression spring acting on the pressing pin, and U — is a ratio quantity resulting from $(1-U)U_1\omega_o^2 = Z$, when U — is the unbalance of the first unbalance mass, and $\omega_o$ — is the lowest exciting angular frequency.

4. An unbalance vibration generator as set forth in claim 2 wherein said cam surfaces are curved only in planes parallel to said radially extending plane, said pressing pins having edges which extend normal to said radially extending plane and engage said cam surfaces.

5. An unbalance vibration generator as set forth in claim 4 wherein each of said heads of said guide pins has a pair of opposite cam surfaces, a respective pressing pin engaging each said cam surface under the action of said spring means.

6. An unbalance vibration generator adapted to be driven at varying rotational speeds comprising:

a first unbalance mass having a center of gravity;

means for mounting said first unbalance mass for rotation about an axis rotation, the center of gravity of said first unbalance means being located at a distance from said axis of rotation, whereby the center of gravity of said first unbalance means and the axis of rotation of said first unbalance mass define a radially extending plane;

a second unbalance mess having a center of gravity;

means for rotating said second unbalance mass together with said first unbalance mass and for guiding said second unbalance mass for radial movement in said radially extending plane, the center of gravity of said second unbalance mass being located in said radially extending plane at a distance from the axis of rotation and on the side of the axis of rotation opposite to the center of gravity of said first unbalance mass; and resilient restraining means operatively engaging said second unbalance mass for counteracting any radial outward movement of said second unbalance mass due to the centrifugal force acting thereon to maintain the resultant centrifugal force of said first and second unbalance masses substantially constant throughout a range of rotational speed, said resilient restraining means including:

spring means and cam means, said spring means being arranged for acting on said second unbalance mass through said cam means; and said first and second unbalance masses, said spring means and said cam means being so dimensioned that the resultant centrifugal force of said first and second unbalance masses is substantially constant at all rotational speeds within a range of rotational speeds.

7. The unbalance vibration generator as defined in claim 6 wherein:

said unbalance mass rotating and guiding means comprises a pair of parallel guide pins on said second unbalance mass and a pair of parallel guide bores through said first unbalance mass for receiving said guide pins, the axes of said guide pins and guide bores being located in said radially extending plane, said guide pins projecting from said guide bores at the ends thereof remote from said second unbalance mass;

said cam means further includes flaring heads on said guide pins projecting from said guide bores and having cam surfaces thereon, and pressing pins on said first unbalance mass which are guided for movement parallel to the axis of rotation, said pressing pins engaging said cam surfaces of said heads; and said spring means being arranged for acting in an axial direction on said pressing pins.

8. The unbalance vibration generator as defined in claim 7 wherein said cam surface is curved in accordance with the following function:

$$f(\rho) = \sqrt{\frac{2Z\,r_o}{C}} \cdot \sqrt{1 - \rho + \frac{1}{U}\ln\frac{1-U}{1-U_\rho}}\ ,$$

wherein $f$ — is the distance by which the cam surface extends beyond the periphery of the guide pin at the point of engagement of the pressing pin, $r$ — is the distance of the center of gravity of the second unbalance mass from the axis of rotation, $r_o$ — is the minimum value of the distance of the center of gravity of the second unbalance mass from the axis of rotation, $\rho = r/r_o$, Z — is the desired constant exciting force, C — is the spring rate of the compression spring acting on the pressing pin, and U — is a ratio quantity resulting from $(1-U)U_1\omega_o^2 = Z$, when $U_1$ — is the unbalance of the first unbalance mass, and $\omega_o$ — is the lowest exciting angular frequency.

9. The unbalance vibration generator as defined in claim 7 wherein said cam surfaces are curved only in planes parallel to said radially extending plane, said pressing pins having edges which extend normal to said radially extending plane and engage said cam surfaces.

10. The unbalance vibration generator as defined in claim 9 wherein each of said heads of said guide pins includes a pair of opposite cam surfaces, a respective pressing pin engaging each said cam surface in response to said spring means.

11. In an unbalance vibration generator adapted to be driven at varying rotational speeds and including a first unbalance mass having a center of gravity; means for mounting said first unbalance mass for rotation about an axis of rotation, said center of gravity of said first unbalance mass being located at a distance from said axis of rotation, whereby said center of gravity of the first unbalance mass and said axis of rotation define a radially extending plane; a second unbalance mass having a center of gravity; and means for rotating said second unbalance mass together with said first unbalance mass and for guiding said second unbalance mass for radial movement in said radially extending plane, said center of gravity of said second unbalance mass being located in said radially extending plane at a distance from said axis of rotation and on the side of said axis of rotation opposite to the center of gravity of said first unbalance mass, the improvement comprising:

resilient restraining means operatively engaging said second unbalance mass for resisting radial outward movement of said second unbalance mass due to the centrifugal force acting thereon to maintain the resultant centrifugal force of said first and second unbalance masses substantially constant throughout a range of rotational speeds, said resilient restraining means including:

spring means and cam means, said spring means being arranged for acting on said second unbalance mass through said cam means; and said first and second unbalance masses, said spring means and said cam means being so dimensioned that the resultant centrifugal force of said first and second unbalance masses is substantially constant at all rotational speeds within a range of rotational speeds.

12. The unbalance vibration generator as defined in claim 11 wherein:

said unbalance mass rotating and guiding means comprises a pair of parallel guide pins on said second unbalance mass and a pair of parallel guide bores through said first unbalance mass for receiving said guide pins, the axes of said guide pins and guide bores lying in said radially extending plane, said guide pins projecting from said guide bores at the ends thereof remote from said second unbalance mass;

said cam means comprising flaring heads on said guide pins projecting from said guide bores and having cam surfaces thereon, and pressing pins on said first unbalance mass which are guided for axial movement parallel to the axis of rotation, said pressing pins engaging said cam surfaces of said heads; and said spring means acting in an axial direction on said pressing pins.

13. The unbalance vibration generator as set forth in claim 12 wherein said cam surface is curved in accordance with the following function:

$$f(\rho) = \sqrt{\frac{2Z\,r_o}{C}} \cdot \sqrt{1 - \rho + \frac{1}{U} \ln \frac{1-U}{1-U_\rho}}\ ,$$

wherein $f$ — is the distance by which the cam surface extends beyond the periphery of the guide pin at the point of engagement of the pressing pin, $r$ — is the distance of the center of gravity of the second unbalance mass from the axis of rotation, $r_o$ — is the minimum value of the distance of the center of gravity of the second unbalance mass from the axis of rotation, $\rho = r/r_o$, Z — is the desired constant exciting force, C — is the spring rate of the compression spring acting on the pressing pin, and U — is a ratio quantity resulting from $(1-U)U_1\omega_o^2 = Z$, when $U_1$ — is the unbalance of the first unbalance mass, and $\omega_o$ — is the lowest exciting angular frequency.

14. The unbalance vibration generator as defined in claim 12 wherein said cam surfaces are curved only in planes parallel to said radially extending plane, said pressing pins having edges which extend normal to said radially extending plane and engage said cam surfaces.

15. The unbalance vibration generator as defined in claim 14 wherein each of said heads of said guide pins includes a pair of opposite cam surfaces, a respective pressing pin engaging each said cam surface in response to said spring means.

* * * * *